US006963414B2

United States Patent
Iguchi

(10) Patent No.: US 6,963,414 B2
(45) Date of Patent: *Nov. 8, 2005

(54) PRINTING APPARATUS AND METHOD OF CONTROLLING SAME

(75) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

This patent is subject to a terminal disclaimer.

(21) Appl. No.: 09/808,991

(22) Filed: Mar. 16, 2001

(65) Prior Publication Data

US 2001/0022666 A1 Sep. 20, 2001

(30) Foreign Application Priority Data

Mar. 17, 2000 (JP) ........................................ 2000-076629

(51) Int. Cl.$^7$ ............................................. G06M 15/00
(52) U.S. Cl. ...................................... 358/1.13; 358/1.18
(58) Field of Search .............................. 358/1.18, 1.13, 358/1.1, 1.11, 539; 382/198, 206

(56) References Cited

U.S. PATENT DOCUMENTS 4,193,119 A * 3/1980 Arase et al. .................... 704/2
5,583,978 A * 12/1996 Collins et al. ............... 345/170

* cited by examiner

*Primary Examiner*—Arthur G. Evans
(74) *Attorney, Agent, or Firm*—Fitzpatrick, Cella, Harper & Scinto

(57) ABSTRACT

The invention seeks to display the setting of a spoken language, which is used in a printer, in such a manner that the setting can be understood irrespective of set values. Messages indicative of settable items as well as settings are stored in a language message map. Both the message and the setting regarding a language setting among the settable items are expressed in the English language and stored. When a status print is performed, messages concerning the items that have been set and the corresponding settings are read out of the language message map and are printed.

23 Claims, 10 Drawing Sheets

FIG. 2

| LANGUAGE | JAPANESE - LANGUAGE MESSAGE | ENGLISH - LANGUAGE MESSAGE |
|---|---|---|
| NUMBER OF COPIES | コピー部数 : 1 | Copies : 1 |
| PAPER | 用紙サイズ : A4 | Paper : LTR |
| LANGUAGE | Language : Japanese | Language : English |

設定
　　Language　　：　Japanese
　　コピー部数　：　1
　　用紙サイズ　：　A4

設定
   言語　　　　：　Japanese
   コピー部数　：　1
   用紙サイズ　：　A4

PRINTING APPARATUS AND METHOD OF CONTROLLING SAME

FIELD OF THE INVENTION

This invention relates to a printing apparatus and to a method of controlling the same. More particularly, the invention relates to a method of processing print data in status printing or the like for checking the settings of a printing apparatus.

BACKGROUND OF THE INVENTION

In a printing apparatus such as a printer or copier, various settings can be made by the user. These settings can be printed by a function referred to as a "status print" function. Status print is a means of printing out a list of various settings of the PDL (Page Description Language) and hardware possessed by the printing apparatus and is used by a user, developer or person in charge of maintenance to check the set items of the printing apparatus and to perform test printing. The printing apparatus is adapted to support foreign languages in accordance with countries or areas in which it is used and the language used in status print also takes the languages of various countries into account. The set items include the language used and when status printing is carried out, all settings are printed in the set language.

However, in a case where a language that cannot be understood by a software developer or maintenance individual using the status print function has been set as the language used, the various set items concerning the printing apparatus will not be understood by the user, even if they are printed out in status print. Moreover, the user will not even be able to determine in what language the set items have been printed. In such cases, it is difficult to decide what the language is when the content of the printout is to be translated.

SUMMARY OF THE INVENTION

Accordingly, an object of the present invention is to provide a printing apparatus and method of controlling the same in which a language that is being used to indicate the status of the apparatus proper can be output so as to be understandable by the user regardless of the content of the settings concerning the language used.

According to the present invention, the foregoing object is attained by providing a printing apparatus that allows a user to make various settings inclusive of a selection of used language, comprising:

an output unit for outputting information; and an output control unit for, in response to request for outputting setting information indicating the various settings, controlling the output unit to output the setting information;

wherein said output control unit controls said output unit to output language information indicating the used language by expressing the language information in symbols that are independent of the language that has been set as the used language, and output setting information exclusive of the language information by expressing the setting information exclusive of the language information in the language that has been set as the used language.

The symbols preferably are the symbols of a specific language, and the specific language preferably is the English language.

The output unit preferably displays messages.

The output unit preferably prints messages.

Preferably, the apparatus further comprises a conversion unit for converting those settings, from among settings that have been stored by a settings storage unit, that are other than a setting concerning the language used, to messages in a language conforming to the setting concerning the language used, and storing these messages in a message storage unit.

Preferably, the conversion unit initially reads out the setting concerning the language used from among the settings that have been stored by the settings storage unit, and converts other settings to messages in a language conforming to the setting concerning the language used.

In accordance with another aspect of the present invention, there is provided a printing apparatus comprising: a settings storage unit for storing settings inclusive of a setting of language used; a message storage unit for storing messages expressed in a plurality of languages, the messages corresponding to respective ones of the settings; and an output unit for outputting the setting of the language used using a message expressed by specific symbols, and outputting settings other than the setting of language used by using messages corresponding to the set language, which messages have been stored in the message storage unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a table illustrating an example of information possessed by a language message map in the printing apparatus of this embodiment;

FIG. 9 is the first example of a printout of status print in a case where Japanese is set as the used language.

FIG. 10 is the second example of a printout of status print in a case where Japanese is set as the used language.

DESCRIPTION OF THE PREFERRED EMBODIMENTS

Preferred embodiments of the present invention will now be described.

[First Embodiment]

Figure 1:
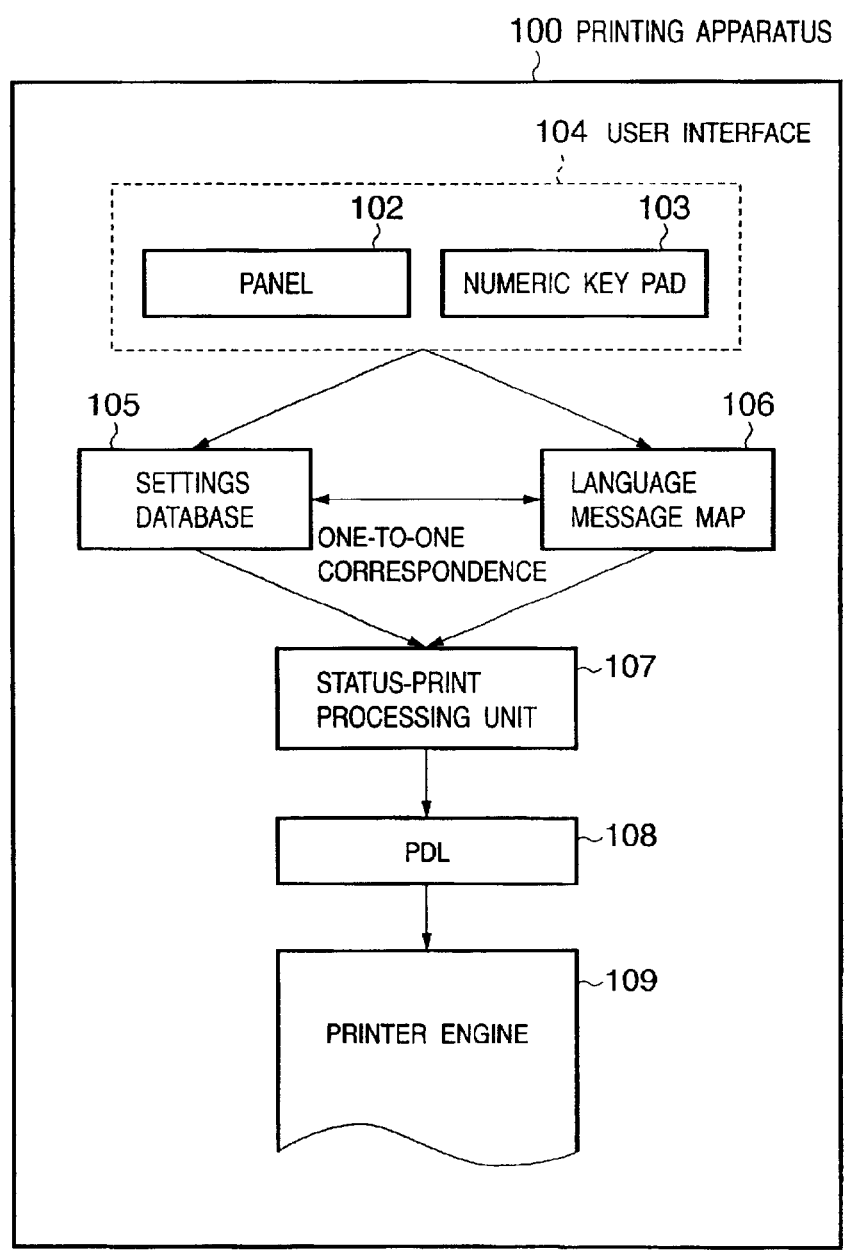
FIG. 1 is a block diagram illustrating the basic implementation of processing for status print in a printing apparatus according to a preferred embodiment of the present invention.

FIG. 1 is a block diagram useful in describing the structure of a printing apparatus 100 to which an embodiment of the present invention can be applied.

As shown in FIG. 1, the printing apparatus 100 includes a settings database 105 for managing collectively the settings relating to a printer. The user changes the settings in the database 105 through a user interface 104. A language message map 106 is a database for internationalizing messages corresponding to settings in the settings database 105. Reference is had to the language message map 106 from a panel 102 on the user interface 104 and from a status-print processing unit 107. The status-print processing unit 107 refers to currently prevailing language setting information held in the settings database 105, acquires a settings message, which corresponds to the language that has been set as the language used, from the language message map 106, generates image data indicative of this message by a PDL processing unit 108 and prints the message using a printer engine 109. Thus, status-print data is created in the language that has been set as the language used, and the message and setting are printed as the status printout.

Figure 5:
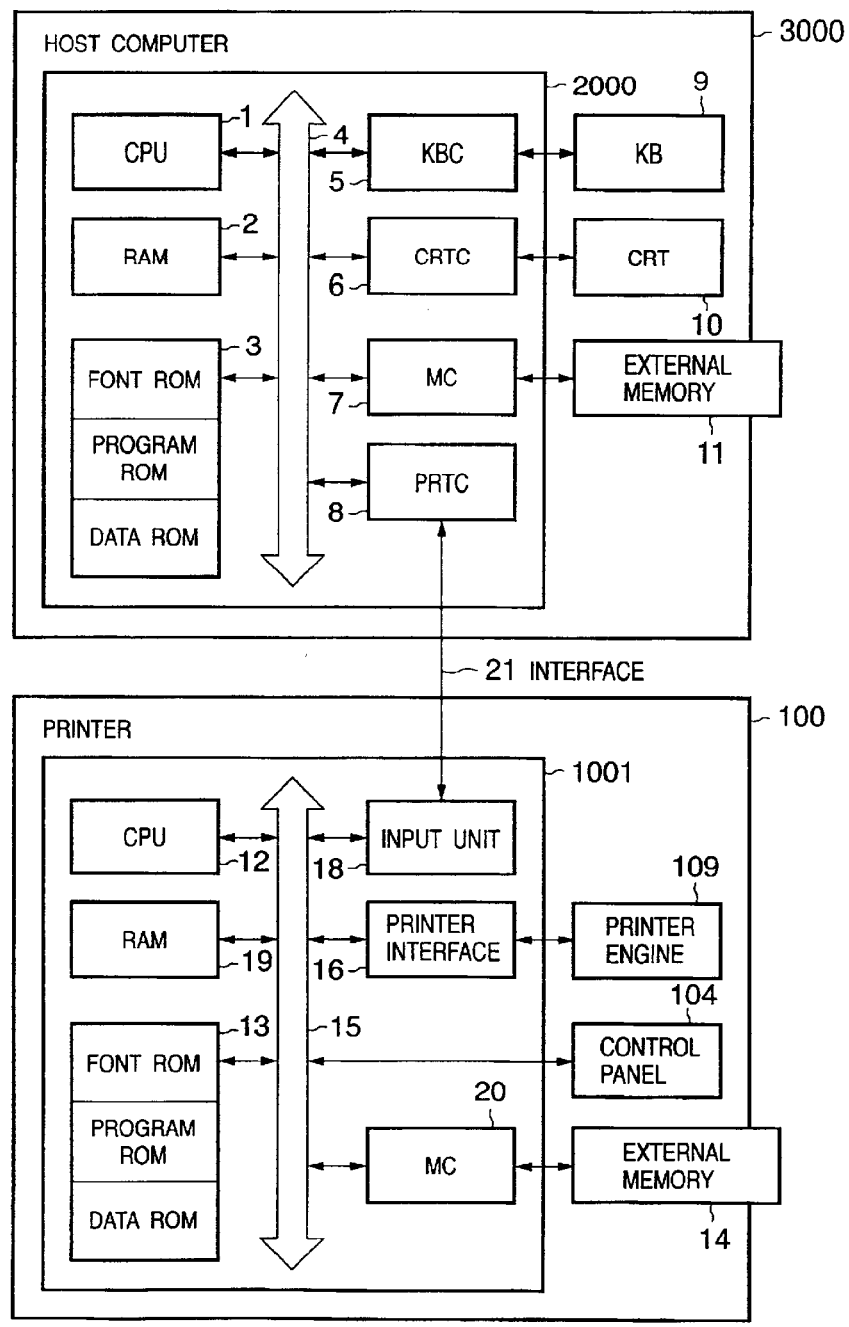
FIG. 5 is a block diagram illustrating the printing apparatus of this embodiment.

FIG. 5 illustrates the hardware configuration of a printing system that employs the printer of this embodiment. The hardware includes a host computer 3000 having a CPU 1 for executing processing of documents, which contain a mixture of figures, images, characters and tables (inclusive of flowcharts and the like), based upon a document processing program that has been stored in a program ROM area of a ROM 3. The CPU 1 performs overall control of various devices connected to a system bus 4. A RAM 2 functions as the main memory and work area of the CPU 1. A keyboard controller (KBC) 5 controls key inputs from a keyboard 9 and pointing device, which is not shown. A CRT controller (CRTC) 6 controls the display on a CRT display 10. A main controller (MC) 7 controls access to an external memory 11, such as a hard disk (HD) or floppy disk (FD), which stores a booting program, various applications, font data, user files and edited files. A printer controller (PRTC) 8, which is connected to a printer 1000 via a prescribed bidirectional interface 21, executes processing for controlling communication with the printer 1000. The CPU 1 executes processing to expand (rasterize) outline fonts into display information RAM set in the RAM 2, and is capable of implementing a WYSIWYG (What You See I What You Get) function for displaying, on CRT 10, an image that is identical with the content that is printed. On the basis of commands designated by a mouse cursor (not shown) on the CRT 10, the CPU 1 opens various windows that have been registered and executes a variety of data processing.

A printer 100 has a printer CPU 12 which, on the basis of a control program stored in a program ROM area of a ROM 13, controls overall access to various devices connected to a device bus 15 and outputs an image signal, which serves as output information, to a printing unit (printer engine) 17 connected via a printer interface 16. The CPU 12, which can execute processing for communicating with the host computer via the bidirectional interface 21, is capable of notifying the host computer 3000 of information internal to the printer. A RAM 19 functions as a main memory and work area, etc., of the CPU 21. An input unit 18 controls the communication of status information such as print-status information with the host computer 3000 via the bidirectional interface 21 and is capable of notifying the host computer 3000 of information internal to the printer. A main controller (MC) 20 controls access to an external memory 14, such as a hard disk (HD) or floppy disk (FD), which stores a booting program, various applications, font data, user files and edited files. A control panel (user interface) 104, which includes a display panel and a keyboard, supplies information to the operator and allows the operator to enter commands.

It should be noted that the settings data and language message map shown in FIG. 1 have been stored in the RAM 2. Power is supplied at all times by a back-up power supply so that the settings database and language message map will not vanish in the event of a power failure. Further, the status-print processing unit 107 and PDL processing unit 108 are realized by having the CPU 12 execute programs that have been stored in the ROM 13.

The language message map 106 in this arrangement converts all settings and their messages to a corresponding language, and the resulting data is held in the language message map 106.

Figure 8:
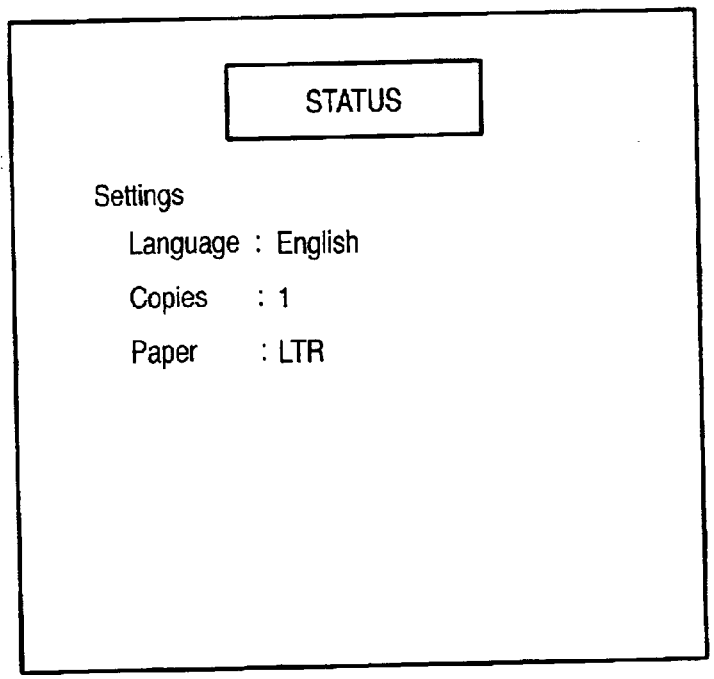
FIG. 8 is an example of a printout of status print in a case where English is set as the used language.

For example, assume that a technician who understands only the English language requests status print in order to check the settings of the printing apparatus. The printing apparatus, because the language used has been set to English, outputs the status print in English, as shown in FIG. 8, allowing the technician to understand the content of status print. However, if the content of status print is expressed entirely in the Japanese language, the technician looking at this content, even if he or she can recognize that Chinese-style characters are being used in status print, cannot tell with certainty whether this language is Japanese, Chinese or Korean. As a consequence, the technician does not know into what language the content of status print should be translated.

Figure 10:
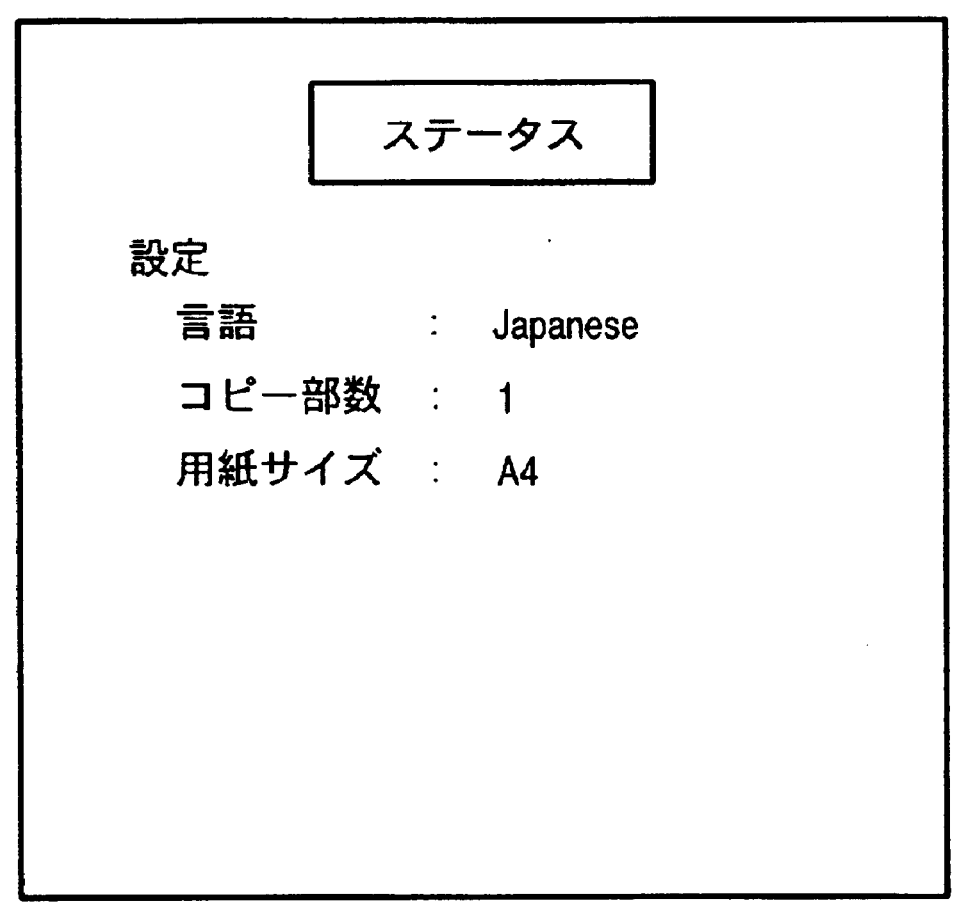

In the present embodiment, therefore, insofar as the language-setting information which indicates a used language is concerned, messages and settings are both stored in English and the language-setting information is expressed entirely in English in status print as well, as shown in FIGS. 9 and 10.

Figure 4:
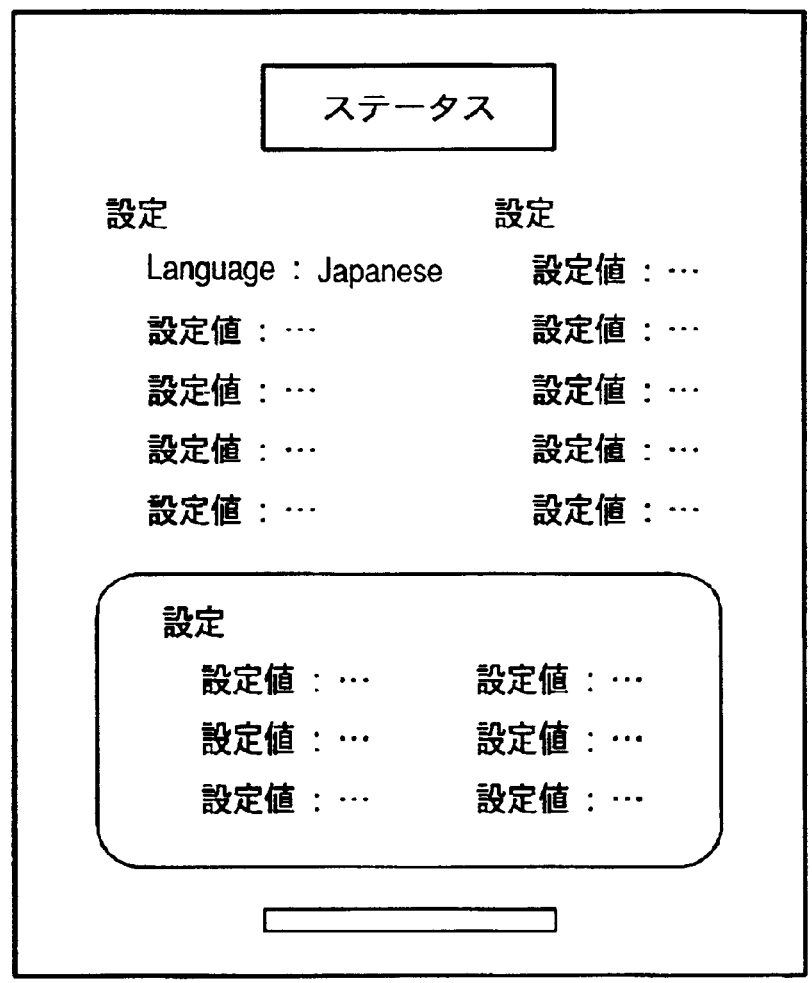
FIG. 4 is a diagram showing an example of a printout of status print expressed in the Japanese language in the printing apparatus of this embodiment.

FIG. 2 is a table illustrating an example of messages corresponding to languages. These messages are stored in the language message map 106. The language-setting information is stored entirely in English regardless of the designated language. For example, if Japanese has been designated as the language, コピー部数: 1" is stored in the language message map as the item for the number of copies. However, "Language: Japanese" is stored in the language message map as the item for language used and therefore the language-setting information indicated in status print is expressed in English as "Language" Japanese", as shown in FIG. 4, irrespective of the set language. As a result, if the technician can at least understand English, then he or she can tell in what language the status print is being indicated. This facilitates the translation of the content of status print.

Figure 3:
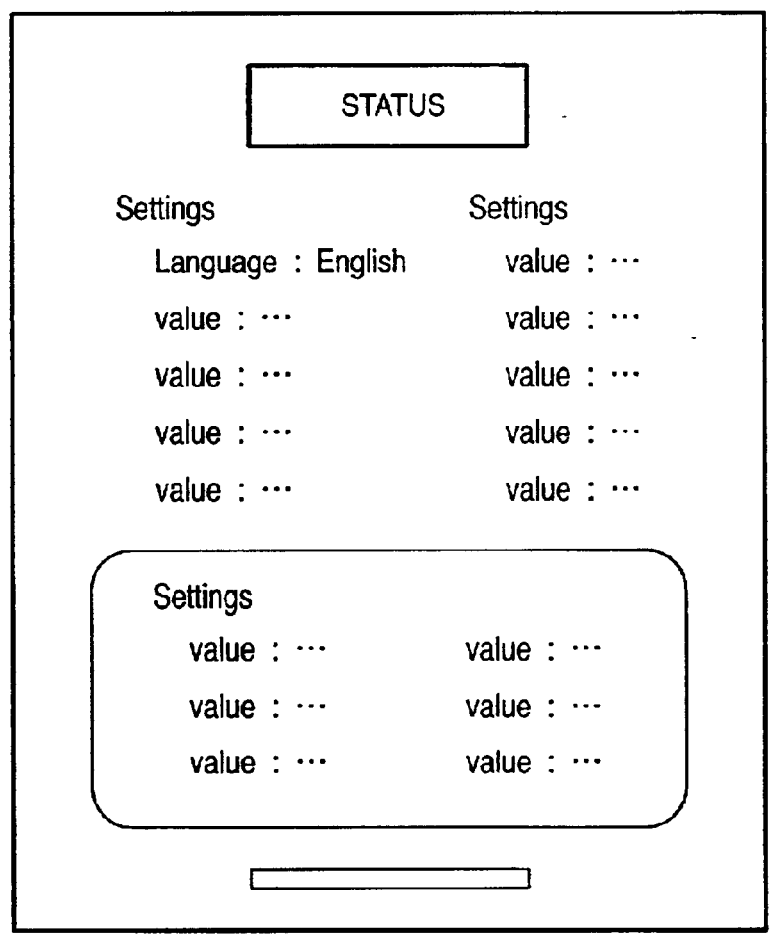
FIG. 3 is a diagram showing an example of a printout of status print expressed in the English language in the printing apparatus of this embodiment.

When status print is performed in this case, the language-setting information also can be handled in the same manner as other settable items because the data that has been stored in the language message map need only be output as is. The English-language messages shown in FIG. 2 are combined with the form data as shown in FIG. 3 in a case where English is selected as the used language, whereas the Japanese-language messages shown in FIG. 2 are combined with the form data as shown in FIG. 4 in a case where Japanese is selected as the used language.

Further, messages and settings that have been stored in the language message map can be used also when each of the settings items are set. That is, a message and a setting for an item that is to be set may be read in from the language message map 106 and displayed on the panel 102 of the user interface 104.

Thus, the printer according to this embodiment is such that if the printer has been set to a language that cannot be understood by a developer or maintenance individual, etc., first reference is made to the language setting, which is being indicated in English, when the various settings items of the printing apparatus are checked by status print. This makes it possible to readily determine from the status print the language that is currently set. This facilitates the translation of the content of status print into the appropriate language.

Second Embodiment

In the first embodiment, a case is described in which messages corresponding to settings items as well as the settings have been registered in the language message map 106 used in outputting the settings items. In this embodiment, however, a printer in which the language setting itself can be changed will be described.

Figure 7:
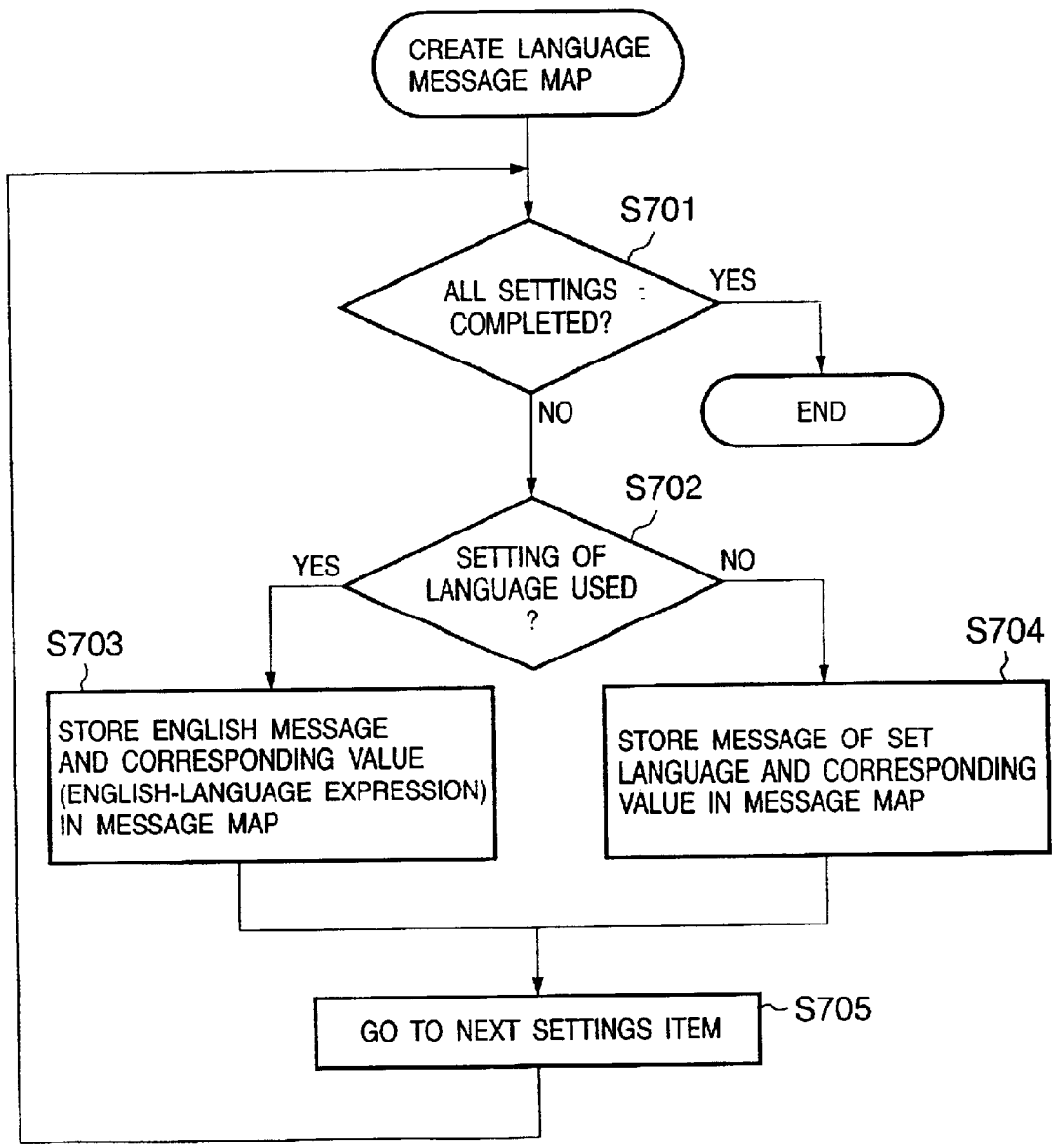
FIG. 7 is a flowchart of a procedure for creating a language message map according to a second embodiment of the invention.

FIG. 7 illustrates a procedure for creating messages when values of the settings items are changed, or after these values have been changed, by the user interface 104.

First, at step S701, it is determined whether the setting of all settings items has been completed. If setting has not been completed ("NO" at step S701), it is determined at step S702 whether the current item is the setting of language used. If the setting to be made is the setting of language used ("YES" at step S702), then an English-language message corresponding to this item and an English-language expression of the corresponding value are stored in the language message map 106 as a pair at step S703.

If the item is other than the setting of language used ("NO" at step S702), then a message in the set language corresponding to this item and the setting corresponding to this item are stored in the language message map 106 as a pair at step S704. It should be noted that by initially determining the setting of language used, all content regarding the ensuing items can be stored in the language message map 106 by being expressed in the set language. If the setting of one items is finished, control proceeds to the next item at step S705 and processing from step S701 onward is repeated.

The above-described procedure makes it possible to create a language message map in a set language whenever a language is set. At such time, expression in the English language is performed only with regard to an item for a language setting. As a result, a language item can be indicated in English also when the language message map is utilized in the manner of the first embodiment.

Third Embodiment

Figure 6:
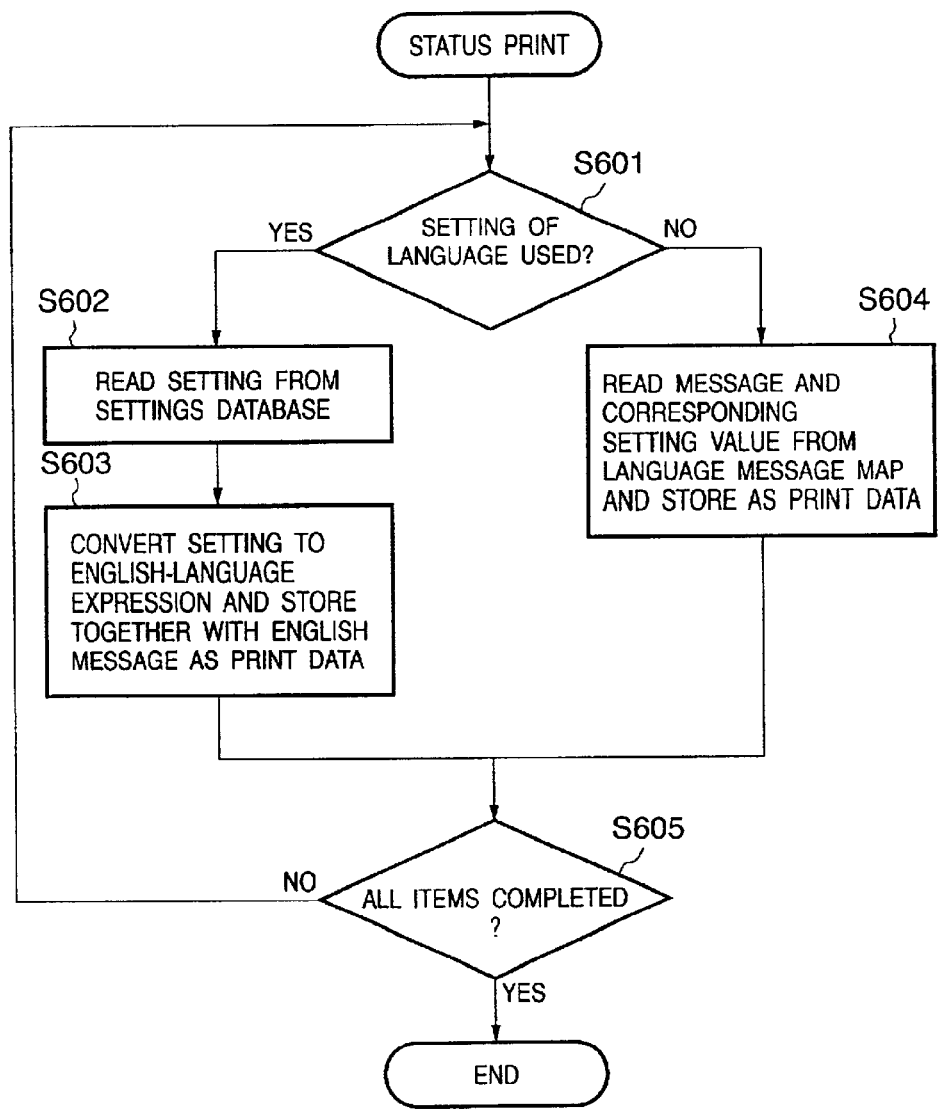
FIG. 6 is a flowchart of a status-print procedure according to a third embodiment of the invention.

In the first embodiment, messages concerning language-setting information converted entirely to English and the setting values are stored by the language message map 106. However, implementation is possible by having the status-print processing unit 107 acquire only the settings of the language-setting information from the settings database 105 and convert these settings to expressions in the English language. According to this embodiment, the language message map need not include a message and value with regard to an item for language used. FIG. 6 illustrates a procedure, which is executed by the status-print processing unit 107, for achieving this.

First, at step S601 in FIG. 6, it is determined whether an item that is about to be converted to print data is an item for setting of language used. If the item is not a language setting ("NO" at step S601), then the message concerning this item and the setting are read out of the language message map 106 and are stored as print data at step S604.

If the item is an item for setting of language used, then the present setting of this item is read out of the settings database 105 at step S602. Next, the setting is converted to an English-language expression and is stored as print data by being paired with the English-language message corresponding to this language-setting item at step S603.

The method of making this conversion is as follows, by way of example: In a case where a numeral corresponding to the language used has been set as the setting of language used, the number that is the setting and the language name expressed in the English language corresponding to this number are stored beforehand in the form of a table in a ROM. The English-language expression of the language that corresponds to the value indicating the language used can then be acquired from this table by the status-print processing unit 107 or control panel 102. It will suffice to prepare beforehand an English-language message as the item name of the language used and to then utilize this message.

This procedure is repeated for each item until it is determined at step S605 that all items have been completed.

The print data thus created through the procedure of FIG. 6 is converted to image data by the PDL processing unit 108 and the image data is printed by the printer engine 109.

By adopting this arrangement, a language setting can be indicated in English and other items can be indicated in the set language.

In the foregoing embodiments, the item for setting language is indicated in English. However, if the symbols used are easy to understand and indicate the selected language, the indication is not limited to the English language. For example, the design of a flag corresponding to the language may be indicated as the language item in the status printout.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the present invention as described, the language used to indicate the status of a printing apparatus itself can be output in identifiable form, irrespective of the settings, no matter what language has been set as the language used.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus that allows a user to make various settings inclusive of a selection of used language, comprising:

an output unit for outputting information; and an output control unit for, in response to a request for outputting setting information indicating the various settings, controlling the output unit to output the setting information;

wherein said output control unit controls said output unit to output language information indicating the used language by expressing the language information in symbols that are independent of the language that has been set as the used language, and output setting information exclusive of the language information by expressing the setting information exclusive of the language information in the language that has been set as the used language.

2. The apparatus according to claim 1, further comprising:

a setting storage unit for storing settings inclusive a setting of the used language; and a message storage unit for storing messages corresponding to respective ones of the settings wherein the messages are output as the setting information by said output unit;

wherein the message corresponding to the setting of the used language is expressed by the symbols that are independent of the language that has been set as the used language, and the messages corresponding to the settings other than the setting of the used language are expressed by the language that has been set as the used language.

3. The apparatus according to claim 2, wherein the symbols are a specific language.

4. The apparatus according to claim 3, wherein the specific language is the English language.

5. The apparatus according to claim 2, wherein said output unit displays messages.

6. The apparatus according to claim 2, wherein said output unit prints messages.

7. The apparatus according to claim 2, further comprising a conversion unit for converting those settings, from among settings that have been stored by said settings storage unit, that are other than a setting concerning the language used, to messages in a language conforming to the setting concerning the language used, and storing these messages in said message storage unit.

8. The apparatus according to claim 7, wherein said conversion unit initially reads out the setting concerning the language used from among the settings that have been stored by said settings storage unit, and converts other settings to messages in a language conforming to the setting concerning the language used.

9. A method of controlling a printing apparatus that supports a plurality of languages, comprising:

a setting step of allowing a user to make various settings inclusive of a selection of language used; and an output step of outputting the various settings;

wherein said output step includes outputting the setting of the language used by expressing this setting in symbols that are independent of the language that has been set as the language used, and outputting settings exclusive of the language used by expressing these settings in the language that has been set as the language used.

10. The method according to claim 9, wherein the symbols are a specific language.

11. The method according to claim 10, wherein the specific language is the English language.

12. The method according to claim 9, wherein said output step includes presenting a display.

13. The method according to claim 9, wherein said output step includes performing printing.

14. The method according to claim 9, further comprising a conversion step of converting those settings, from among settings that have been stored by said settings storage unit, that are other than a setting concerning the language used, to messages in a language conforming to the setting concerning the language used, and storing these messages in said message storage unit.

15. The method according to claim 14, wherein said conversion step includes initially reading out the setting concerning the language used from among the settings that have been stored by said settings storage unit, and converting other settings to messages in a language conforming to the setting concerning the language used.

16. A computer program for performing control, which supports a plurality of languages, by computer, said program comprising:

code of a setting step of allowing a user to make various settings inclusive of a selection of language used; and code of an output step of outputting the various settings;

wherein said output step includes outputting the setting of the language used by expressing this setting in symbols that are independent of the language that has been set as the language used, and outputting settings exclusive of the language used by expressing these settings in the language that has been set as the language used.

17. The computer program according to claim 16, wherein the symbols are a specific language.

18. The method according to claim 17, wherein the specific language is the English language.

19. The method according to claim 16, wherein a display is controlled at said output step.

20. The method according to claim 9, wherein printing is performed at said output step.

21. The method according to claim 16, further comprising code of a conversion step of converting those settings, from among settings that have been stored by said settings storage unit, that are other than a setting concerning the language used, to messages in a language conforming to the setting concerning the language used, and storing these messages in said message storage unit.

22. The method according to claim 21, wherein said conversion step includes initially reading out the setting concerning the language used from among the settings that have been stored by said settings storage unit, and converting other settings to messages in a language conforming to the setting concerning the language used.

23. A computer-readable storage medium storing the computer program set forth in claim 16.

* * * * *

UNITED STATES PATENT AND TRADEMARK OFFICE
CERTIFICATE OF CORRECTION

| | | |
|---|---|---|
| PATENT NO. | : 6,963,414 B2 | Page 1 of 1 |
| APPLICATION NO. | : 09/808991 | |
| DATED | : November 8, 2005 | |
| INVENTOR(S) | : Shunshuke Iguchi | |

It is certified that error appears in the above-identified patent and that said Letters Patent is hereby corrected as shown below:

Column 2:

Line 48, "and" should be deleted;
    Line 51, "invention." should read --invention;--;
    Line 53, "language." should read --language;--; and
    Line 55, "language." should read --language; and--.

Column 5:

Line 35, "items" should read --item--.

Column 7:

Line 25, "inclusive" should read --inclusive of--.

Column 8:

Line 42, "method" should read --computer program--;
    Line 44, "method" should read --computer program--;
    Line 48, "method" should read --computer program--; and
    Line 55, "method" should read --computer program--.

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 6,963,414 B2  Page 1 of 1
APPLICATION NO. : 09/808991
DATED : November 8, 2005
INVENTOR(S) : Shunshuke Iguchi It is certified that error appears in the above-identified patent and that said Letters Patent is hereby corrected as shown below:

ON THE TITLE PAGE at (*) Notice:

"This patent is subject to a terminal disclaimer." should be deleted.

Signed and Sealed this

Thirty-first Day of March, 2009

JOHN DOLL
*Acting Director of the United States Patent and Trademark Office*